US012209843B2

(12) United States Patent
Seuk

(10) Patent No.: US 12,209,843 B2
(45) Date of Patent: Jan. 28, 2025

(54) ATTACHMENT FOR WEAPON MOUNTED LASER

(71) Applicant: Jo Won Seuk, Whispering Pines, NC (US)

(72) Inventor: Jo Won Seuk, Whispering Pines, NC (US)

( * ) Notice: Subject to any disclaimer, the term of this patent is extended or adjusted under 35 U.S.C. 154(b) by 59 days.

(21) Appl. No.: 18/199,986

(22) Filed: May 22, 2023

(65) Prior Publication Data

US 2023/0375308 A1 Nov. 23, 2023

Related U.S. Application Data

(60) Provisional application No. 63/344,519, filed on May 20, 2022.

(51) Int. Cl.

| | |
|---|---|
| ***F41G 11/00*** | (2006.01) |
| ***F21L 4/00*** | (2006.01) |
| ***F21V 23/04*** | (2006.01) |
| ***H01H 3/12*** | (2006.01) |

(52) U.S. Cl.

CPC ................. *F41G 11/00* (2013.01); *F21L 4/00* (2013.01); *F21V 23/0428* (2013.01); *H01H 3/122* (2013.01)

(58) Field of Classification Search

CPC ............. F21V 23/0414; F21V 23/0421; F21V 23/0428; F41G 11/00; H01H 3/122

See application file for complete search history.

(56) References Cited

U.S. PATENT DOCUMENTS

| | | | | |
|---|---|---|---|---|
| 2002/0093815 A1* | 7/2002 | Ou | F21L 4/005 | |
| | | | 362/800 | |
| 2008/0278937 A1* | 11/2008 | Bono | F21L 4/005 | |
| | | | 362/205 | |
| 2009/0129064 A1* | 5/2009 | Zeller | F21L 4/027 | |
| | | | 362/105 | |
| 2009/0205935 A1* | 8/2009 | Frick | F21V 23/0414 | |
| | | | 200/60 | |
| 2010/0128470 A1* | 5/2010 | Swan | F21L 4/04 | |
| | | | 362/157 | |
| 2017/0146315 A1* | 5/2017 | Bruhns | F41C 23/10 | |
| 2018/0172223 A1* | 6/2018 | Mishan | F21V 23/0421 | |
| 2019/0186867 A1* | 6/2019 | Bruhns | F41C 23/22 | |
| 2020/0208814 A1* | 7/2020 | Li | F21V 19/02 | |

FOREIGN PATENT DOCUMENTS

EP 1114962 A2 * 7/2001 .............. F21L 15/14

* cited by examiner

*Primary Examiner* — Alexander K Garlen
(74) *Attorney, Agent, or Firm* — Crump Law P.C.

(57) ABSTRACT

An attachment for conventional weapon mounted lasers that provides a larger and more convenient and ergonomic interface of actuating the laser. The laser attachment is molded or formed as a single piece from a pliable rubber or similar material and has a switch cover and a pair of opposed side straps. The side straps are dimensioned and configured to wrap around the laser and affix to the bottom of the laser. The switch cover is dimensioned and configured to seat and nest over the activation switch on the top of the laser. The switch cover has interior (bottom) and exterior (top) surfaces that substantially mirror the profile to the activation switch; however, the switch cover has a diameter larger than the activation switch. Depressing any area of the switch cover actuates the laser. The larger surface area of the switch cover provides improved acquisition for the user without increasing size or footprint of the laser.

4 Claims, 8 Drawing Sheets

ATTACHMENT FOR WEAPON MOUNTED LASER

This application claims the benefit of U.S. Provisional Patent Application, Ser. No. 63/344,519 filed May 20, 2022, the disclosure of which is hereby incorporated by reference This invention relates to an attachment for a weapon mounted laser, and in particular, an attachment that overlies the laser switch to improve laser activation.

BACKGROUND AND SUMMARY OF THE INVENTION

Weapon mounted lasers are well known in the firearms industries and applications. Most weapon mounted lasers, such as the ATPIAL manufactured by L3 Harris Technologies Corporation of Melbourne, Florida, have top mounted control switches, that allow the users to quickly active the laser. Traditionally, these activation switches take the form of a large depressible button that extends from the top of the laser body. In tactical applications, it is obviously desirable to reduce the size and weight of the weapon mounted laser. While reducing the size of the laser body is desirable, it also means that the size of the activation switches is reduced thereby reducing the ergonomics of the laser. For example, the latest generation of L3 weapon mounted laser, the NGAL, has a smaller activation switch from its predecessor the ATPIAL.

The attachment of this invention mounts to conventional weapon mounted lasers and provides a larger and more convenient and ergonomic interface for actuating the laser. The attachment is molded or formed from a pliable rubber or similar material and has a switch cover and a pair of opposed side straps. The side straps are dimensioned and configured to wrap around the laser and affix to the bottom of the laser. The switch cover is dimensioned and configured to seat and nest over the activation switch on the top of the laser. The switch cover has interior (bottom) and exterior (top) surfaces that substantially mirror the profile to the activation switch; however, the switch cover has a diameter larger than the activation switch. Depressing any area of the switch cover actuates the laser. The larger surface area of the switch cover provides improved acquisition for the user without increasing the size or footprint of the laser.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which.

DESCRIPTION OF THE PREFERRED EMBODIMENT

Figure 1:
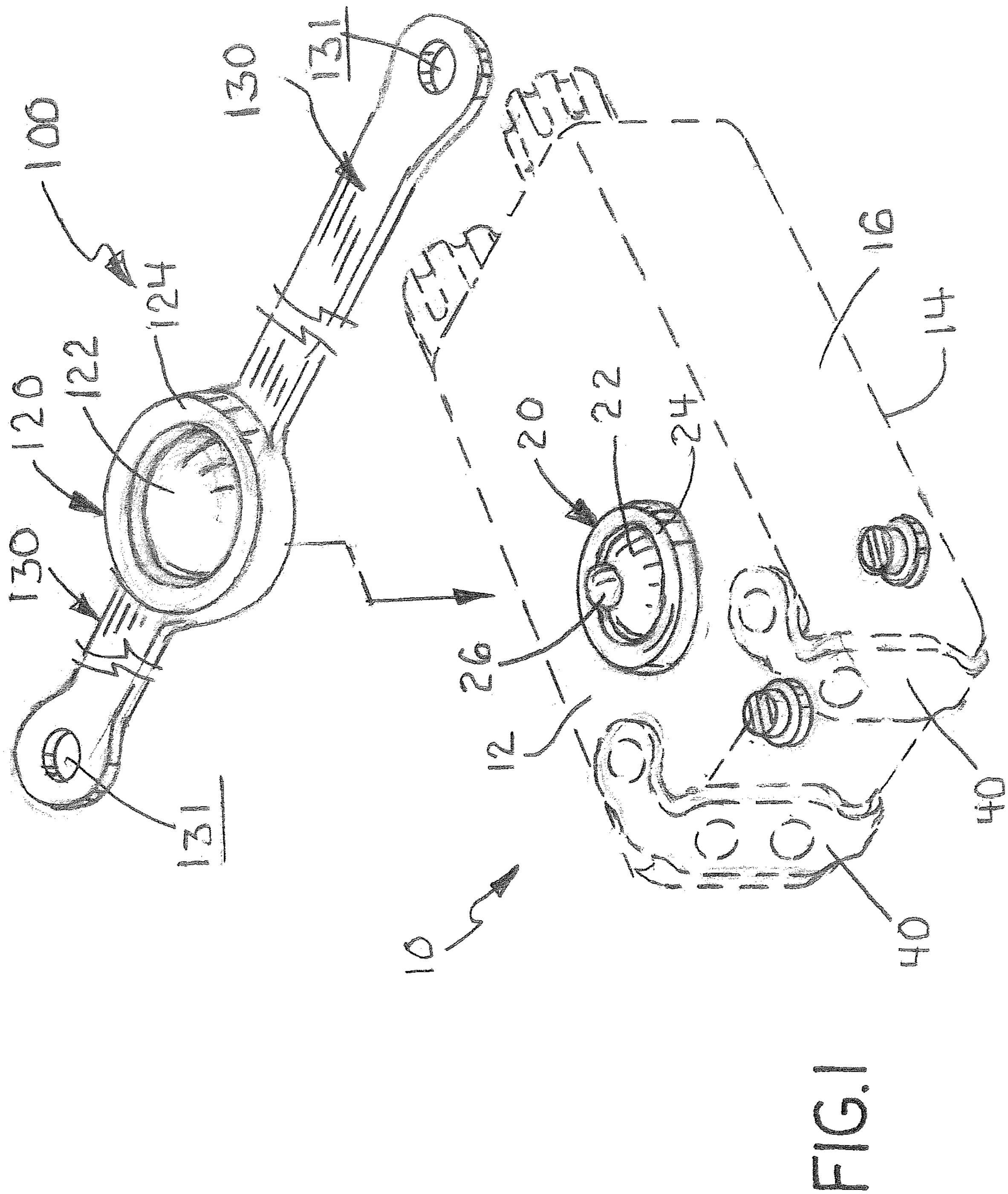
FIG. 1 is a perspective view of an exemplary example of the laser attachment and a laser.
Figure 2:
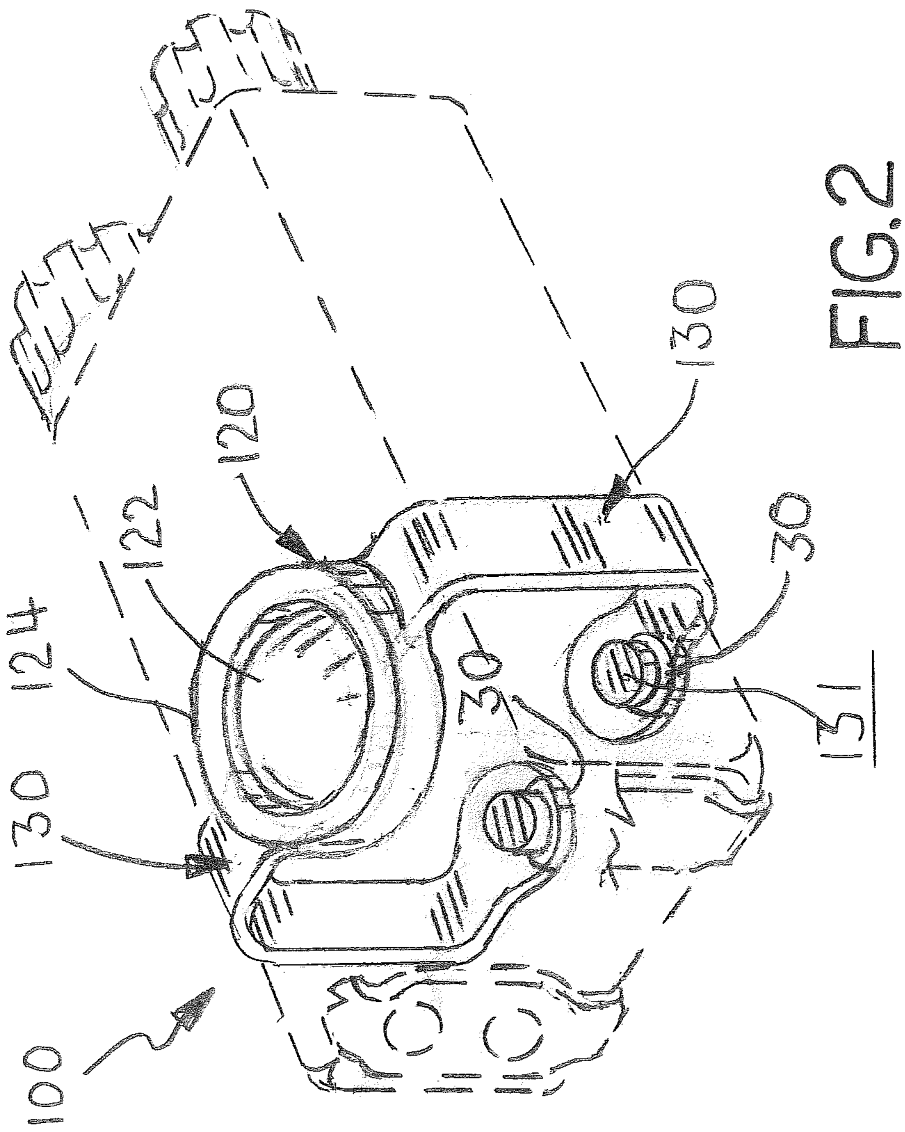
FIG. 2 is a perspective view of the laser attachment of FIG. 1 mounted to the laser.
Figure 3:
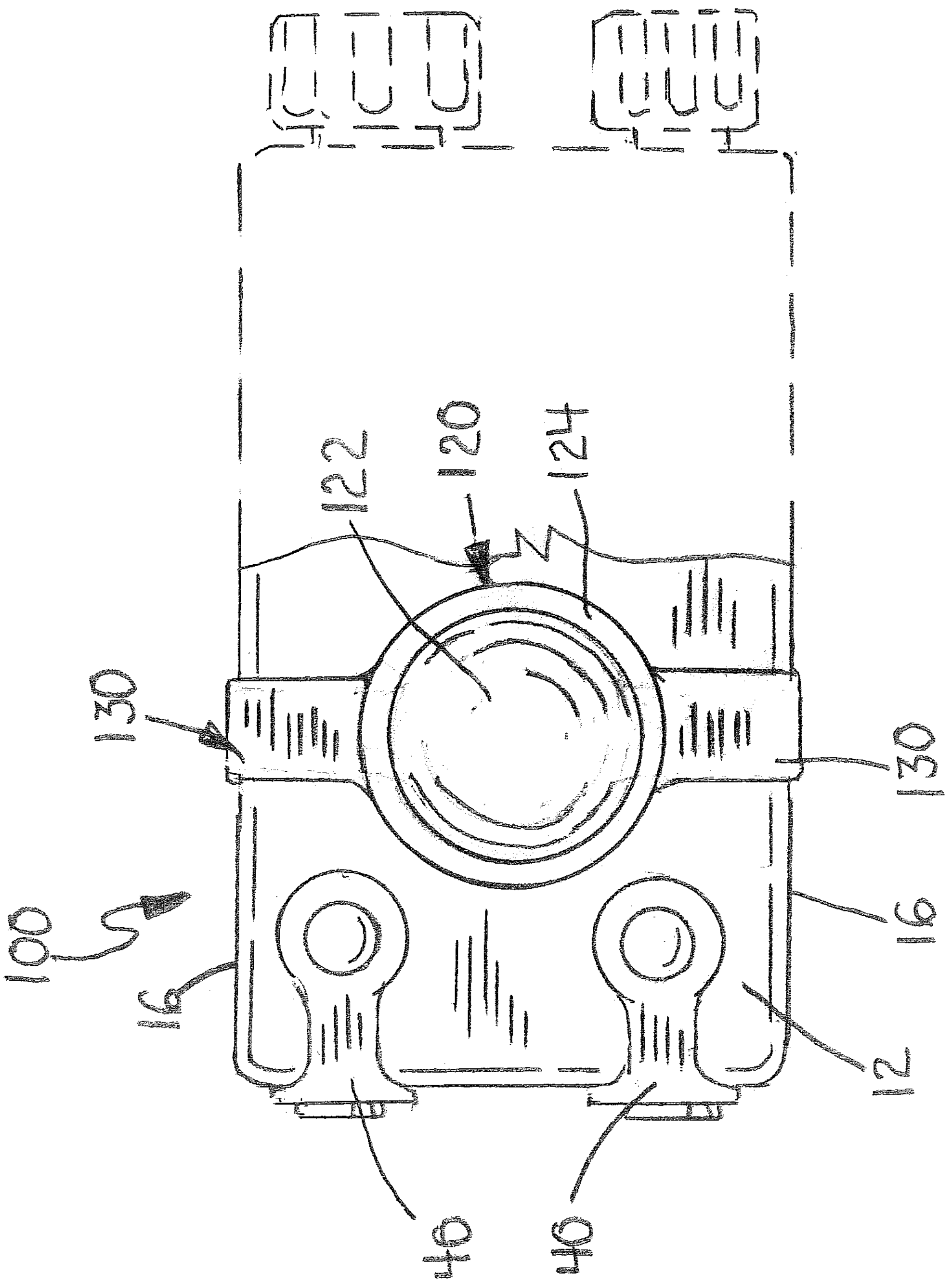
FIG. 3 is a top view of the laser attachment of FIG. 1 mounted to the laser.
Figures 4, 5, 6:
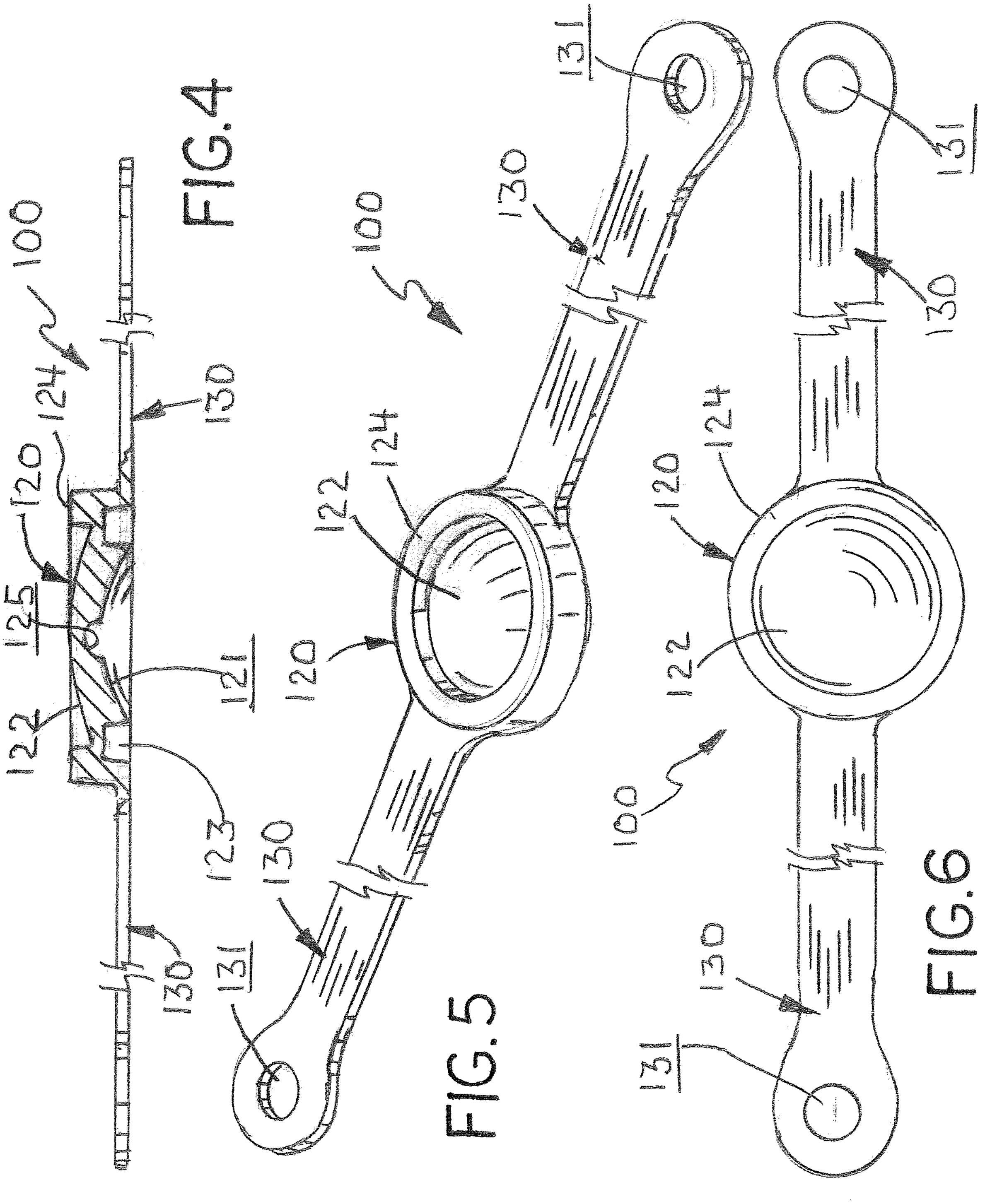
FIG. 4 is a partial side sectional view of the laser attachment of FIG. 1.
FIG. 5 is a perspective view of the laser attachment of FIG. 1.
FIG. 6 is a top view of the laser attachment of FIG. 1.
Figure 7:
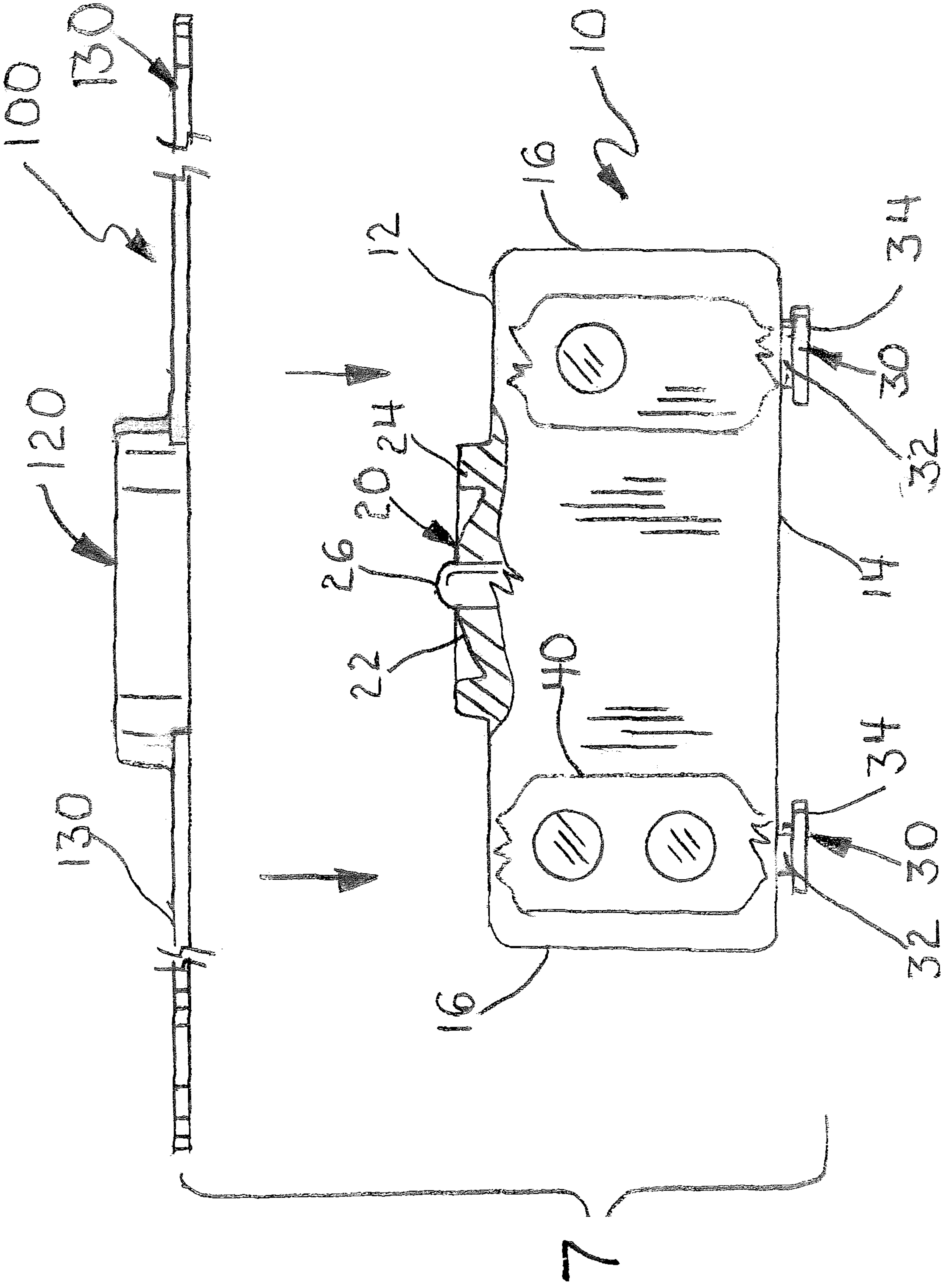
FIG. 7 is a front view of the laser attachment of FIG. 1 and the laser.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Referring now to the drawings, FIGS. 1-9 illustrate an exemplary embodiment of the switch attachment of this invention, which is designated generally as reference numeral 100. As shown, laser attachment 100 is fitted to a weapon mounted laser aiming device (the "laser") 10. In the drawings, laser attachment 100 is illustrated in use on the Next Generation Aiming Laser ("NGAL") manufactured by L3Harris Technologies Corporation of Melbourne, Florida, but may be adapted for use on other conventional weapon lasers.

As shown, laser 10 includes a laser body that houses the illuminator lens, control circuitry and battery power supplies. The laser body is generally box shaped having a flat top 12, bottom 14 and sides 16. Laser 10 includes an activation switch 20 extending from laser top and a pair of posts 30 extends from laser bottom 14. Activation switch 20 is depressed to actuate the various functions of laser 10. Activation switch 20 is centrally positioned atop laser 10. Activation switch 20 is generally formed of a pliable material and has a domed central switch body 22 and a raised annular rim 24 extending concentrically around the central switch body. Laser 10 can be activated by depressing activation switch 20 anywhere along the domed central switch body 24. Activation switch 20 also has a raised central nipple 26, which provides an index point for users. Each posts 30 have a short cylindrical shaft 32 and a flat circular button head 34. Posts 30 originally are used to retain illumination covers 40 that cover and protect the exposed illuminators extending from the front of laser 10 when the laser is not in use. In the present invention, posts 30 are used to secure switch attachment 100 to laser 10, as well as, to retain the laser's illuminations covers.

Laser attachment 100 is molded or formed as a single piece from a pliable rubber or material similar to the material from which activation switch 20 is made. As shown, laser attachment 100 has a switch cover 120 and a pair of opposed side straps 130 extending from the switch cover. Side straps 130 are dimensioned and configured to wrap around laser 10 and affix to laser posts 30. The distal end of each strap 130 has a hole 131 for receiving post 30. Switch cover 120 is dimensioned and configured to seat and nest over activation switch 20. Switch cover 120 has interior (bottom) and exterior (top) surfaces that substantially mirror the profile to activation switch 20. The interior (bottom) surface of switch cover 120 is adapted and configured to receive and seat atop activation switch 20. The interior (bottom) surface of switch cover 120 has a concave central portion 121 that receives domed central switch body 22, and annular recess 123 that restrictively seats atop raised annular rim 24, and a central detent 125 that receives nipple 26. The exterior (top) surface of switch cover 120 has a domed central surface 122 and a raised annular rim 124 extending concentrically around the central domed surface. As shown, rim 124 extends to the height of domed central surfaced 122 and provides a perimeter raised barrier to prevent inadvertent actuation of activations switch 20.

Figure 8:
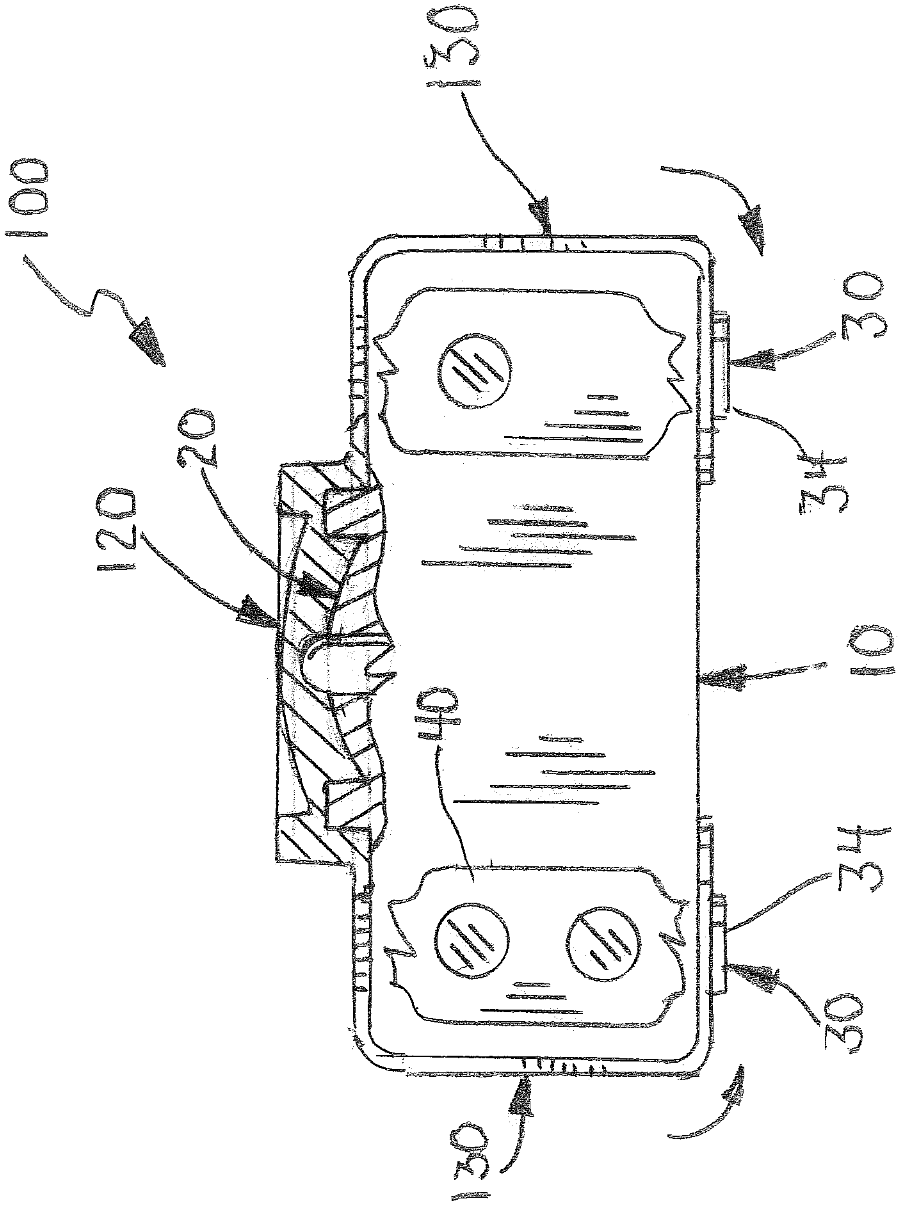
FIG. 8 is a partial front sectional view of the laser attachment of FIG. 1 mounted to the laser.
Figure 9:
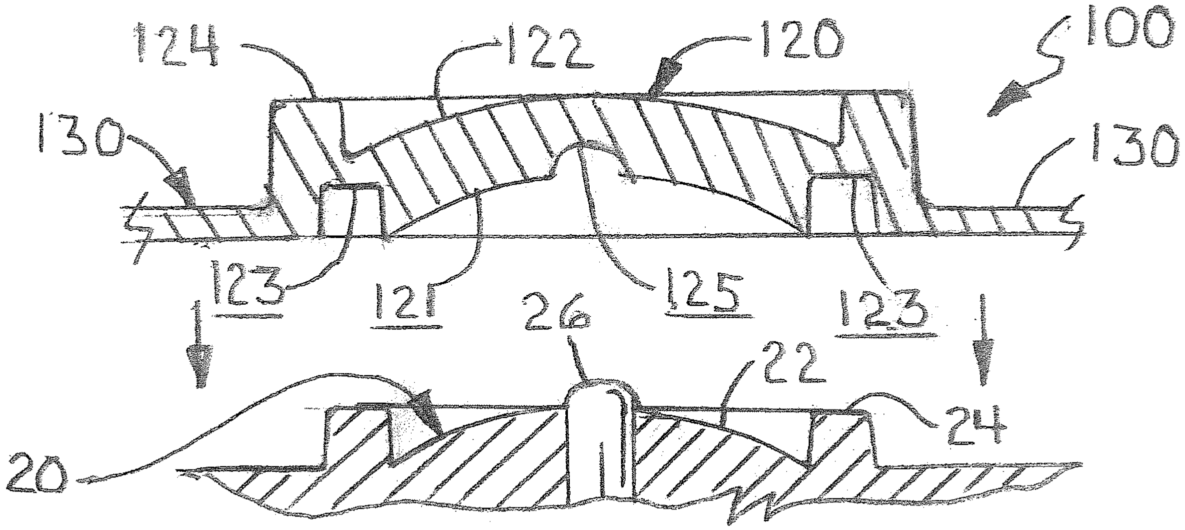
FIG. 9 is a side sectional view of the laser attachment of FIG. 1 and the activations switch of the laser.
Figure 10:
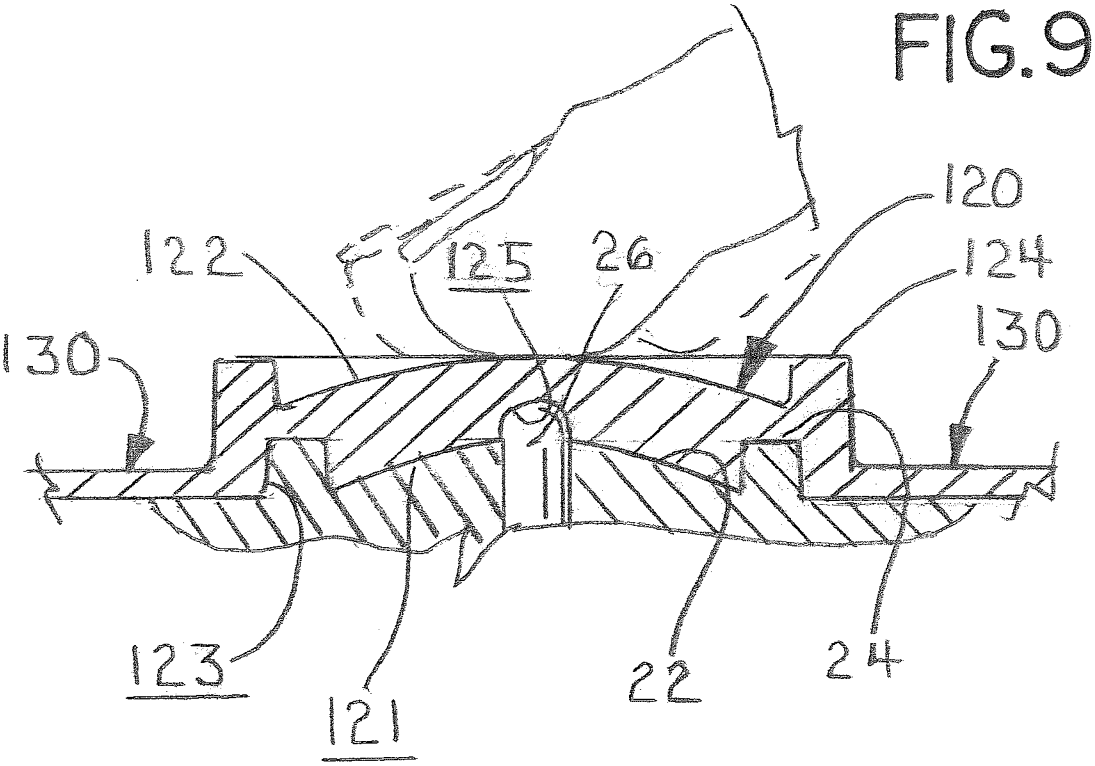
FIG. 10 is a side sectional view of the laser attachment of FIG. 1 mounted to the activations switch of the laser.
Figure 11:
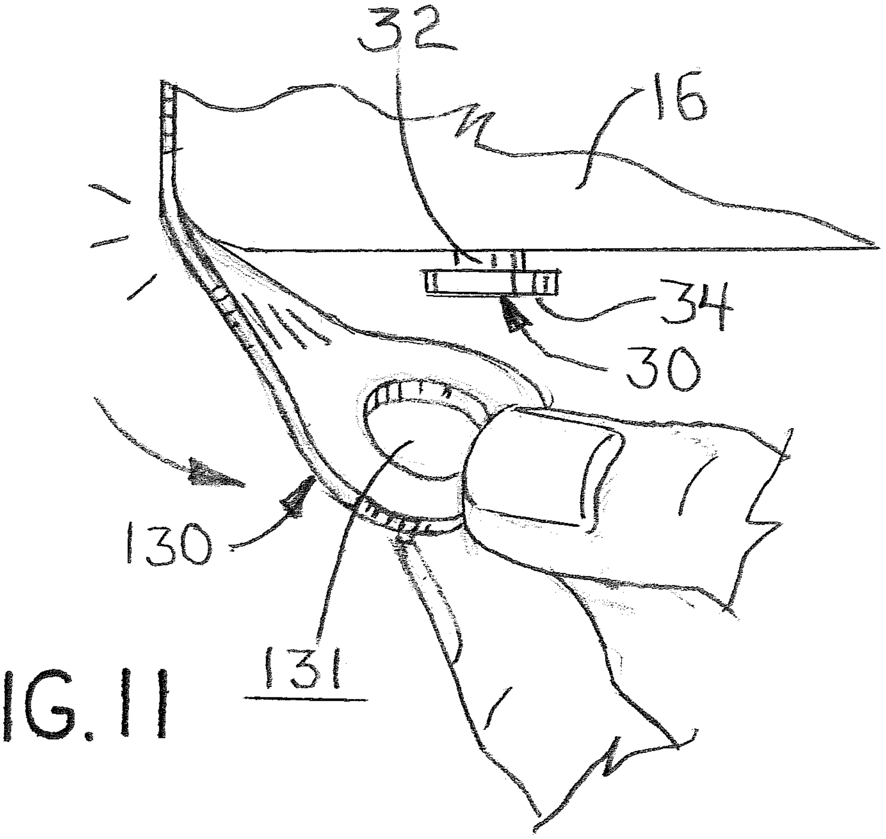
FIG. 11 is a partial front view of the laser attachment of FIG. 1 mounting to the laser posts.
Figure 12:
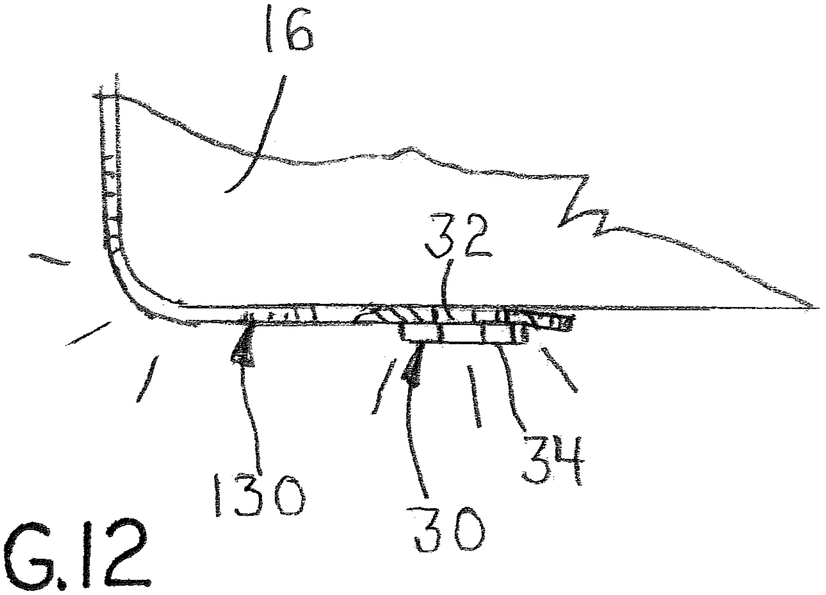
FIG. 12 is a partial front view of the laser attachment of FIG. 1 mounted to the laser posts.

As shown best in FIGS. 2, 8, 11 and 12, laser attachment 100 is mounted to laser 10 with switch cover 120 nested over and against activations switch 20 and straps 130 wrapped around the laser body and affixed to posts 30. The pliable material of laser attachment 100 allows straps 130 to be fitted to posts 30 with strap holes 131 stretching to extend over button heads 34 and retract around post shafts 32 (FIGS. 11 and 12). Affixing straps 130 around laser 10 positions switch cover 120 directly over and against activation switch 20 (FIGS. 8-10). Switch cover 120 has a diameter larger than the activation switch (FIG. 8). Depressing any area of central portion 121 of switch cover 120, depresses domed central switch body 22 thereby actuating laser 10. The larger exterior (top) surface of switch cover 120 provides improved acquisition for the user without increasing the size or footprint of laser 10.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. An attachment for a laser, where the laser includes a laser body having an opposed laser top and laser bottom and opposed laser sides, and a depressible domed laser switch mounted to the laser top and a pair of laser posts extending from the laser bottom, the attachment comprising:

a depressible switch cover adapted to overlie the laser switch; and a pair of opposed straps extending from the switch cover and adapted to wrap around the laser body and affix to the laser posts; wherein depressing the switch cover depresses the laser switch, thereby actuating the laser.

2. The attachment of claim 1 wherein the switch cover nests against the laser switch when the attachment is mounted to the laser.

3. The attachment of claim 1 wherein the each of the pair of opposed straps has an opening for restrictively receiving one of the pair of laser posts.

4. The attachment of claim 1 wherein the switch cover has a domed exterior surface having a diameter larger than the diameter of the laser switch.

* * * * *